United States Patent [19]

Sasnett et al.

[11] 4,134,083

[45] Jan. 9, 1979

[54] METHOD OF REDUCING ARCING IN A GAS TRANSPORT LASER

[75] Inventors: Michael W. Sasnett, Los Altos; Angus H. Whitaker, Monte Sereno, both of Calif.

[73] Assignee: GTE Sylvania Incorporated, Mountain View, Calif.

[21] Appl. No.: 793,050

[22] Filed: May 2, 1977

[51] Int. Cl.² ............................................. H01S 3/22
[52] U.S. Cl. ........................... 331/94.5 G; 331/94.5 T
[58] Field of Search ................................... 331/94.5 G

[56] References Cited

U.S. PATENT DOCUMENTS

| | | | |
|---|---|---|---|
| 3,641,455 | 2/1972 | Matovich | 331/94.5 G |
| 3,723,902 | 3/1973 | Patel | 331/94.5 G |
| 3,772,610 | 11/1973 | Foster et al. | 331/94.5 G |
| 3,813,612 | 5/1974 | Schriever et al. | 331/94.5 G |
| 3,982,205 | 9/1976 | Sutton et al. | 331/94.5 G |

*Primary Examiner*—William L. Sikes
*Attorney, Agent, or Firm*—John F. Lawler

[57] ABSTRACT

The method of reducing arcing in a high power gas transport laser consists of introducing molecular oxygen into the carbon dioxide mixture in which the glow discharge takes place. The oxygen may be in pure form or may be mixed with nitrogen as in air and is admitted to the recirculating gas mixture in predetermined quantities during operation of the laser. The effect of this addition of oxygen to the circulating gas mixture is to prevent the formation of oxide coatings on the copper electrode surfaces, and specifically on the cathode, thereby eliminating this cause of arcing in the laser.

3 Claims, 1 Drawing Figure

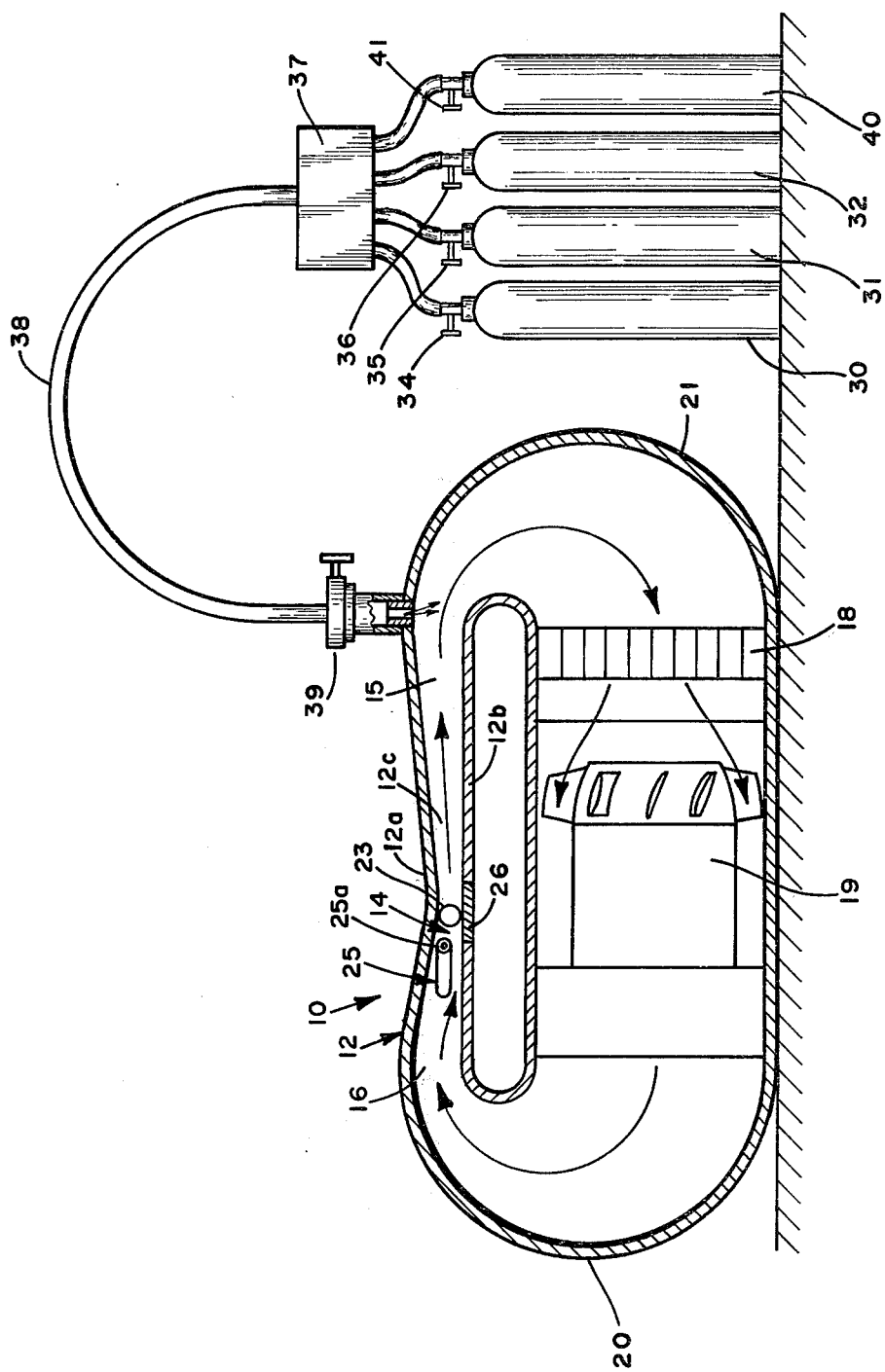

METHOD OF REDUCING ARCING IN A GAS TRANSPORT LASER

BACKGROUND OF THE INVENTION

This invention relates to high power lasers and more particularly to a method of reducing arcing in a high power gas transport laser.

The gas transport laser as described in U.S. Pat. No. 3,772,610, assigned to the assignee of this invention, is capable of generating output powers in the order of 1 KW or greater by means of a continuous electrical discharge across the flowing gas in the laser cavity. This discharge energizes the molecules of the $CO_2$ mixture which ultimately causes the gas to lase and produces the coherent laser output beam. The gas mixture is recirculated, cooled and returned to the active lasing region in a closed circuit fluid path. The gas mixture typically comprises 78% (by volume) helium, 18% nitrogen, 4% carbon dioxide. The cathode is a straight smooth preferably copper tube extending transversely of the direction of the gas flow and the anode comprises a plurality of conductive pads coextensive with the cathode and connected to the electrical circuits through ballast resistors which control the uniformity of current over the area of the electrodes.

While this laser has performed successfully in the field in producing continuous wave output beams at high powers, a problem has been experienced in that after approximately twenty hours of continuous operation a cupric oxide coating or layer forms on the cathode surface and causes arcing between the electrodes. In addition, a cuprous oxide film forms around the edges of the active area of the cathode but does not seem to be detrimental to performance of this electrode. The cupric oxide is detrimental, however, due to its low thermal conductivity and thick build-up. This produces hot spots on the cathode which promote arcing. Such cupric oxide build-up has necessitated shut down of the laser, removal of the cathode from the laser, sanding of the oxide layer from the cathode surface, repolishing the cathode surface and replacing the cleaned cathode in a laser. This is time consuming and costly and adversely affects the use of this laser in production operations requiring long intervals of uninterrupted laser service.

OBJECTS AND SUMMARY OF THE INVENTION

A general object of this invention is the provision of a method of substantially increasing the time of operating a high power $CO_2$ gas transport laser continuously without arcing.

Another object is the provision of a method of preventing the formation of a continuous oxide layer on the cathode of such a laser.

A more specific object is the provision of a method of extending the time of continuous operation of a $CO_2$ gas transport laser without arcing by a factor greater than 10, i.e., from 20 hours to more than 200 hours.

These and other objects of the invention are achieved by the step of adding oxygen to the $CO_2$ gas mixture in the laser. The oxygen is in molecular form and is continuously injected into the circulating gas mixture in the laser along with the other components of the mixture as part of the replenishment procedure. This single additional step has resulted in elimination of the formation of a continuous oxide layer on the cathode and thus has greatly increased laser operating time between cathode reconditioning procedures.

BRIEF DESCRIPTION OF THE DRAWING

The single drawing illustrates a gas transport laser (in section) and gas replenishing tanks useful in the practice of the invention.

BRIEF DESCRIPTION OF EMBODIMENTS

Referring now to the drawing, a schematic representation of a closed cycle high power gas transport laser system 10 is shown. The system has a channel or duct 12 with an outer wall 12a, an inner wall 12b and side walls, one of which is shown as 12c, generally configured to define a closed fluid path through which a gas mixture is recirculated in the direction of the arrows. The channel has a rectangular cross-sectional shape and has a narrow or throat section 14 which defines the active or lasing action of the system, a diffuser zone 15 on the downstream side of the active region in which the gas velocity is reduced and a nozzle section 16 upstream from the active region in which the gas velocity is increased prior to entering the throat. The lower portion of the system as shown includes a heat exchanger 18 which removes heat from the gas flowing through it and a vane-axial blower 19 which circulates the gas through the channel. Curved end sections 20 and 21 of the duct smoothly change the direction of flow of the gas between the upper and lower parts of the system.

The gas mixture previously used in this laser system consisted of helium, nitrogen and carbon dioxide in well-known porportions that support lasing action in the active region 14 for producing coherent light at 10.6 microns. By way of example, the gas mixture consists of the following in percent by volume: 78% helium, 18% nitrogen and 4% carbon dioxide.

Mounted in the side walls of the channel in optical alignment with the lasing region are mirrors, one of which is shown at 23, between which the beam of coherent light is reflected when the system is operated as either an oscillator or an amplifier. The electric discharge in the lasing region 14 of the laser occurs between a cathode 25 and an anode 26 which extend transversely of the direction of flow of gas through the channel for a substantial portion of its width. Cathode 25 comprises a tubular conductor, preferably made of copper, spaced inwardly from top wall 12a and has portion 25a extending perpendicular to the direction of flow of gas in the channel. The cathode is connected to a negative terminal of an external direct current power supply, not shown. Anode 26 preferably comprises a plurality of segments or pads mounted in the channel inner wall 12b in a row generally parallel to and coextensive with transverse portion 25a of the cathode. The anode pads are described in greater detail in the aforementioned patent. The anode is energized by electrical connection of the anode pads to the positive terminal of the same power supply that is connected to the cathode.

Lasing action in the region 14 of the system is established by the electrical glow discharge between the cathode portion 25a and anode 26. The reaction of this electrical discharge with molecules of the gas in the lasing region changes the energy states of the gas so that lasing action occurs and a beam of coherent light is generated in the well-known manner.

The circulating $CO_2$ gas mixture is continuously replenished from a source of supply such as pressurized gas tanks 30, 31 and 32 containing helium, nitrogen and carbon dioxide, respectively. The outputs of tanks 30, 31 and 32 are controlled by appropriate valves 33, 34 and 35, respectively, to provide in reservoir 37 a gas mixture of the desired composition. Reservoir 37 is connected by feed line 38 and coupling 39 to the laser apparatus 10 so that the gas mixture in the laser is continuously replenished and retains the same mixture of gases during laser operation.

The foregoing is a brief description of laser aparatus which is a part of the prior art and which therefore does not, per se, constitute this invention.

A problem with this laser apparatus is the tendency of arcing to occur between the electrodes after approximately 20 hours of continuous operation. Copper oxide, specifically cupric oxide, begins to form on the smooth copper cathode surface during the electrical discharge between the electrodes and is dispersed randomly over the operating portion 25a of the cathode. This oxide reduces transfer of heat from the cathode surface to coolant flowing through the cathode and causes hot spots to form on the cathode surface. The hot spots begin to emit higher current densities which in turn heat the hot spots further and the process continues until it culminates in the formation of an arc and terminates laser output.

This necessitates removal of the cathode in order to clean the oxide from it and to again polish the cathode surface. Alternatively, the laser may be run at progressively lower current levels to avoid arcing as the oxide deposit grows but this correspondingly reduces laser beam power.

In accordance with this invention, we have discovered that the addition of a relatively small quantity of oxygen to the gas mixture greatly reduces the formation of copper oxide on the cathode surface 25a. Such oxygen in molecular form preferably is added to the gas mixture by a tank 40 of pure oxygen connected through valve 41 to reservoir 37 where it is mixed with other gases and passed by tube 38 into the laser system. Alternatively, oxygen may be added to the gas mixture in the form of dry air. In this event, the nitrogen tank 31 may be eliminated and the helium and carbon dioxide tank controls adjusted appropriately to compensate for the nitrogen admitted in the dry air. The oxygen may also be pre-mixed with the nitrogen or with the helium-nitrogen-carbon dioxide mixture in proper proportions to achieve the advantages of the invention.

By way of example, oxygen may be added to the laser in the following manner and proportions (in percent by volume):

1. From a single botttle of the following pre-mixed gas:
   $N_2$: 17.6
   $CO_2$: 4.3
   $O_2$: 2.0
   He: 76.1

2. Adding oxygen to nitrogen in a single bottle and maintaining a laser gas mixture in the above-indicated proportions.

3. Adding dry (zero grade) air in place of nitrogen and maintaining the laser gas mixture as follows:
   $N_2$ and $O_2$: 21.6
   $CO_2$: 4.3
   He: 74.1

4. Adding oxygen to the mixture as illustrated in the drawing and maintaining the following proportions:
   $N_2$: 17.6
   $CO_2$: 4.3
   $O_2$: 2-5
   He: Remainder While the theory of operation of the invention is not fully understood, it is believed that atomic oxygen is generated by the breakdown of $CO_2$ to CO (carbon monoxide) and attacks and oxidizes the cathode surface. This reaction is believed to be inhibited by the introduction of molecular oxygen so that the resultant oxidation of the cathode surface is retarded and reduced. In practice, the addition of pure oxygen into the gas mixture at a constant rate of 2.1 Torr/hr. in combination with helium, nitrogen and carbon dioxide at constant rates (in Torr per hour) of 31, 6.9 and 1.8, respectively, resulted in continuous operation of the laser apparatus described in the aforementioned patent for 256 hours with no appreciable copper oxide being formed on the surface of cathode portion 25a and consequently no arcing. Throughout this period the apparatus continued to deliver full rated output power with no change in the quality of the laser beam.

What is claimed is:

1. The method of reducing arcing in a continuous wave laser with output power of at least 1 KW, said laser having an enclosure and a lasing medium comprising a mixture of $CO_2$, He and $N_2$ recirculated in said enclosure, means for continuously supplying predetermined amounts of said $CO_2$, He and $N_2$ from the exterior to the interior of said enclosure, an elongated segmented anode and a coextensive tubular cathode extending parallel to and spaced from said anode, said anode and cathode extending transversely of the direction of flow of said medium, means for applying a high DC voltage across said anode and cathode and producing an electrical discharge therebetween, and means for deriving a beam of coherent light from said discharge, the method consisting of the step of continuously adding a predetermined amount of $O_2$ to said lasing medium during operation of the laser.

2. The method according to claim 1 in which said $O_2$ is premixed with said $N_2$ prior to injection into said lasing medium.

3. The method according to claim 1 in which said mixture comprises in percent by volume substantially 4% $CO_2$, 76% He, 18% $N_2$ and 2% $O_2$.

* * * * *